United States Patent
Seibert et al.

(10) Patent No.: US 9,680,939 B2
(45) Date of Patent: Jun. 13, 2017

(54) MAINTAINING TECHNICAL SUPPORT CONTINUITY ACROSS SYSTEM RESTARTS AND MULTIPLE OPERATING SYSTEMS

(71) Applicant: Dell Products, L.P., Round Rock, TX (US)

(72) Inventors: Philip M. Seibert, Austin, TX (US); Todd Swierk, Austin, TX (US); Gary Douglas Huber, Austin, TX (US); Carlton A. Andrews, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 85 days.

(21) Appl. No.: 14/134,699

(22) Filed: Dec. 19, 2013

(65) Prior Publication Data

US 2015/0180985 A1 Jun. 25, 2015

(51) Int. Cl.
*H04L 29/08* (2006.01)
*G06Q 30/00* (2012.01)
*G06Q 10/06* (2012.01)

(52) U.S. Cl.
CPC .... *H04L 67/143* (2013.01); *G06Q 10/063114* (2013.01); *G06Q 30/016* (2013.01); *H04L 67/146* (2013.01)

(58) Field of Classification Search
CPC ...... H04M 3/5191; H04L 51/04; H04L 65/00; H04L 65/1069; H04L 65/1006; H04L 69/40; H04L 67/02; H04L 9/3234; H04L 67/143; H04L 67/146; G06F 9/4418; G06F 9/45558; G06F 2221/2149; G06F 2221/2111; G06F 21/57; G06F 21/31; G06F 21/575; G06F 11/0793; G06F 11/0748; G06F 11/0742; G06F 17/30861; G06F 2009/4557; G06F 21/568; G06F 9/4408; G06F 3/061; G06F 3/0625; G06F 3/0664; G06F 3/068; G06F 12/0866; G06Q 10/20; G06Q 10/063114; G06Q 30/016; H04W 36/0011

See application file for complete search history.

(56) References Cited

U.S. PATENT DOCUMENTS

| | | | | |
|---|---|---|---|---|
| 7,243,078 | B1* | 7/2007 | Lewis-Hawkins ... | G06Q 30/016 705/26.41 |
| 7,356,677 | B1* | 4/2008 | Rafizadeh ............. | G06F 9/4418 713/1 |
| 7,685,474 | B2* | 3/2010 | Viljoen ............... | G06F 11/0712 714/38.1 |
| 8,001,581 | B2* | 8/2011 | Ford ....................... | G06F 21/31 713/1 |

(Continued)

*Primary Examiner* — Vivek Srivastava
*Assistant Examiner* — Todd L Barker
(74) *Attorney, Agent, or Firm* — Fogarty LLP (57) ABSTRACT

Embodiments of systems and methods for systems and methods for maintaining technical support continuity across system restarts and multiple operating systems are described herein. In an embodiment, a method may include receiving a request to initiate a user support session. Additionally, the method may include receiving a unique identifier associated with a device to be contacted during the user support session. The method may also include establishing a user support session in association with the unique identifier. The unique identifier may be a hardware identification tag, a system-specific service tag, or the like.

18 Claims, 5 Drawing Sheets

(56) References Cited

U.S. PATENT DOCUMENTS

| | | | | |
|---|---|---|---|---|
| 8,239,773 | B1* | 8/2012 | Billman | G06F 17/30861 |
| | | | | 715/751 |
| 8,438,256 | B2* | 5/2013 | Rogel et al. | 709/223 |
| 8,767,945 | B2* | 7/2014 | Simoes et al. | 379/265.09 |
| 2003/0131136 | A1* | 7/2003 | Emerson | H04L 41/00 |
| | | | | 709/250 |
| 2006/0265656 | A1* | 11/2006 | Lambert | G06Q 10/00 |
| | | | | 715/705 |
| 2008/0005462 | A1* | 1/2008 | Pyeon | G06F 3/061 |
| | | | | 711/113 |
| 2008/0162915 | A1* | 7/2008 | Price | G06F 21/57 |
| | | | | 713/2 |
| 2011/0173040 | A1* | 7/2011 | Curtis | G06Q 10/06 |
| | | | | 705/7.13 |
| 2012/0226740 | A1* | 9/2012 | Nath et al. | 709/203 |
| 2013/0007729 | A1* | 1/2013 | Sirotkin | G06F 9/4445 |
| | | | | 718/1 |
| 2013/0332923 | A1* | 12/2013 | Shaposhnik | G06F 21/57 |
| | | | | 718/1 |
| 2014/0024348 | A1* | 1/2014 | Hurst | H04M 3/5232 |
| | | | | 455/414.1 |
| 2014/0047122 | A1* | 2/2014 | Haserodt et al. | 709/228 |
| 2014/0156472 | A1* | 6/2014 | Stuntebeck et al. | 705/28 |
| 2014/0214972 | A1* | 7/2014 | Nemani et al. | 709/206 |
| 2014/0223432 | A1* | 8/2014 | Halim | G06F 9/4445 |
| | | | | 718/1 |
| 2014/0280834 | A1* | 9/2014 | Medved | H04L 47/122 |
| | | | | 709/223 |
| 2014/0310419 | A1* | 10/2014 | Bolan et al. | 709/227 |
| 2014/0310522 | A1* | 10/2014 | Bomgaars | H04L 12/6418 |
| | | | | 713/168 |
| 2014/0317392 | A1* | 10/2014 | Kawano | G06F 9/4406 |
| | | | | 713/2 |
| 2014/0365060 | A1* | 12/2014 | Yamamoto et al. | 701/23 |

* cited by examiner

MAINTAINING TECHNICAL SUPPORT CONTINUITY ACROSS SYSTEM RESTARTS AND MULTIPLE OPERATING SYSTEMS

FIELD

This disclosure relates generally to computer systems, and more specifically, to systems and methods for maintaining technical support continuity across system restarts and multiple operating systems.

BACKGROUND

Internet-based chat is an increasingly common method of communication used in technical support. While troubleshooting or solving technical issues, a support technician frequently needs to reboot the end-users system. Reboots typically cause chat sessions to drop, and frustratingly, the end user has to reconnect to a new chat session and is assigned a new support person. "Catching up" a new support contact creates a poor user experience.

Further complicating this issue, some systems may allow a user, in the midst of a technical support chat session, to reboot from a first operating system (OS) into an Alternate OS on the same machine. Further, the user may even boot into a streamed desktop solution (e.g. On Demand Desktop Streaming (ODDS)) or a virtualized instance of their desktop (VDI) on the same or a different machine. Therefore, support continuity must be maintained not only across reboots, but also across multiple OSs, across different hardware, and across native and virtual environments.

In each of these various scenarios, the internet-based chat session between the support technician and the user may be lost, either upon reboot or upon switching of the OS.

SUMMARY

Embodiments of systems and methods for systems and methods for maintaining technical support continuity across system restarts and multiple operating systems are described herein. In an embodiment, a method may include receiving a request to initiate a user support session. Additionally, the method may include receiving a unique identifier associated with a device to be contacted during the user support session. The method may also include establishing a user support session in association with the unique identifier. The unique identifier may be a hardware identification tag, a system-specific service tag, or the like.

In an embodiment, the user support session may be terminated. In such an embodiment, the method may include reestablishing the user support session associated with the unique identifier. The method may also include storing information associated with the user support session in association with the unique identifier.

In an embodiment, the user support session comprises a chat session between a support provider and a user of the device to be contacted during the user support session. The chat session may be a text-based chat session. Alternatively, the chat session may be a voice-based chat session. In still another embodiment, the chat session is a video-based chat session.

Embodiments of an Information Handling System (IHS) are also presented. In an embodiment, the IHS includes a processor; and a memory coupled to the processor. The memory may include program instructions stored thereon that, upon execution by the processor, cause the IHS to receive a request to initiate a user support session, receive a unique identifier associated with a device to be contacted during the user support session, and establish a user support session in association with the unique identifier.

A non-transitory computer-readable medium having program instructions stored thereon that, upon execution by an Information Handling System (IHS), cause the IHS to send a request to initiate a user support session to a technical support server, send a unique identifier associated with a device to be contacted during the user support session to the technical support server, and establish a user support session with the technical support server in association with the unique identifier is also presented.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
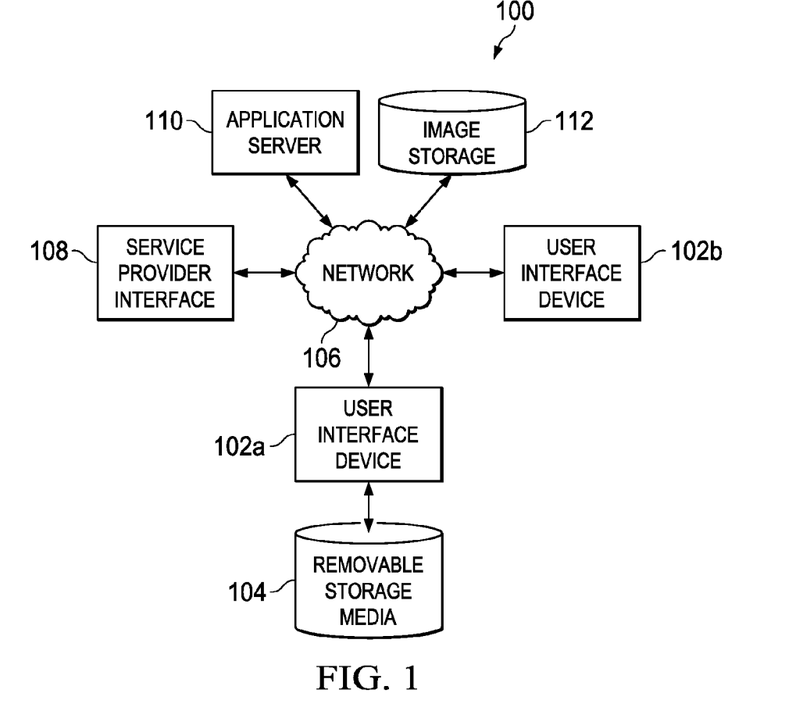
FIG. 1 is a diagram illustrating one embodiment of a system for maintaining technical support continuity across system restarts and multiple operating systems.

FIG. 1 is a diagram illustrating one embodiment of a system 100 for maintaining technical support continuity across system restarts and multiple operating systems. In an embodiment, the system 100 includes one or more user interface devices 102a-b. The user interface devices 102a-b may be computing devices, such as desktop computers, laptop computers, tablet computing devices, mobile computing devices, etc. In other embodiments, the user interface devices may include or be coupled to servers, networking devices, security appliances, or the like. In still other embodiments, the user interfaces may be of diverse types. For example, a first user interface device 102a may be a desktop workstation, and a second user interface device 102b may be a mobile computing device or a tablet computing device. In certain embodiments, aspects of the first user interface device 102a may be tied or related to aspects of the second user interface device 102b. For example, a selection of a user's files, accounts, configuration, applications, etc. may be shared between the first user interface device 102a and the second user interface device 102b. One of ordinary skill will recognize a variety of user interface devices 102a-b that may be configured according to the present embodiments.

In an embodiment, the system 100 may include a removable storage medium 104 which may store information used by the user interface device 102a. Examples of removable storage media 104 include flash memory drives, Secure Digital (SD) cards, optical storage disks, external magnetic disk drives, external Solid State Drives (SSD), etc. In an embodiment, the removable storage media 104 may communicate with the user interface device 102a through a data communication port, such as a Universal Serial Bus (USB) port, or the like. Alternatively, the removable storage media 104 may communicate with the user interface device 102a wirelessly through, e.g., a WiFi or Bluetooth communication interface.

User interface devices 102a-b may be configured to communicate via an interface to network 106. Network 106 may include a Local Area Network (LAN), a Wide Area Network (WAN) connection, a connection to the Internet, etc. The network 106 may include various components, such as network routing devices, network switching devices, network hubs, network firewalls, wireless access points, mobile data connections, telecommunications network backbone hardware, etc. In various embodiments, the network 106 may be configured to receive communication requests from the user interface devices 102a-b and transmit responses from other devices connected to the network 106 back to the user interface devices 102a-b.

In an embodiment, the system 100 may include one or more devices or subsystems which may be provided to service the user interface devices 102a-b. For example, service provider interface 108 may be provided to allow a service provider to communicate with the user interface device 102a. In one example, embodiment, the service provider may be a technical support technician. The technical support technician may establish a user support session, such as a chat session with a user of the user interface device 102a, b. The user support session may additionally include a remote access session, a file transfer session, a voice or video connection, etc. In an embodiment, the user support session may be requested by the user of the user interface device 102a, b. In another embodiment, the user interface device 102a, b may automatically request the user support session in response to encountering a system error.

In an embodiment, the system 100 may also include an application server 110. In such an embodiment, the application server 110 may provide the user interface devices 102a-b with access to one or more applications 110. For example, the user interface device 102a-b may operate as a thin client which displays video related to operations of an application hosted by application server 110, but does not directly handle processing of data associated with operation of the application. In a further embodiment, the user interface device 102a-b may additionally provide an interactive interface allowing the user to enter data or manipulate operation of the application. Data and commands entered by the user at the user interface device 102a, b may be communicated to application server 110 via network 106.

In one example, the application server 110 may be accessed by the user interface device 102a, b in the event of a failure being detected at the user interface device 102a. For example, in the event of a system failure of an operating system, the user interface device 102a, b may automatically switch to a fault recovery mode. In the fault recovery mode, the user interface 102a may still be used by the user to perform tasks, but the operating system may be operated on the application server 110 and the user interface device 102a may simply operate as a user interface client of the application server 110 allowing the user to enter inputs which are communicated to the application server 110 via network 106, and seeing responsive actions of the operating system on the application server 110. One of ordinary skill will recognize additional examples involving applications which may be hosted by application server 110, including word processing applications, email applications, photo editing applications, etc.

In an embodiment, image storage 112 may provide remote storage functionality for user interface device 102a. In one embodiment, the image storage 112 may store a complete image of the data stored on user interface device 102a, b. In another embodiment, the image storage 112 may store a partial image of data stored on the user interface device 102a, b. For example, a selection of files or folders stored on the user interface device 102a may be designated for storage on the image storage 112. In such an embodiment, the files or folders may be communicated to image storage 112 via network 106 for storage. In still another embodiment, incremental changes to information stored on the user interface device 102a may be communicated to image storage device 112, such that the copies of information stored on image storage 112 are synchronized with the information stored on user interface device 102a.

Figure 4:
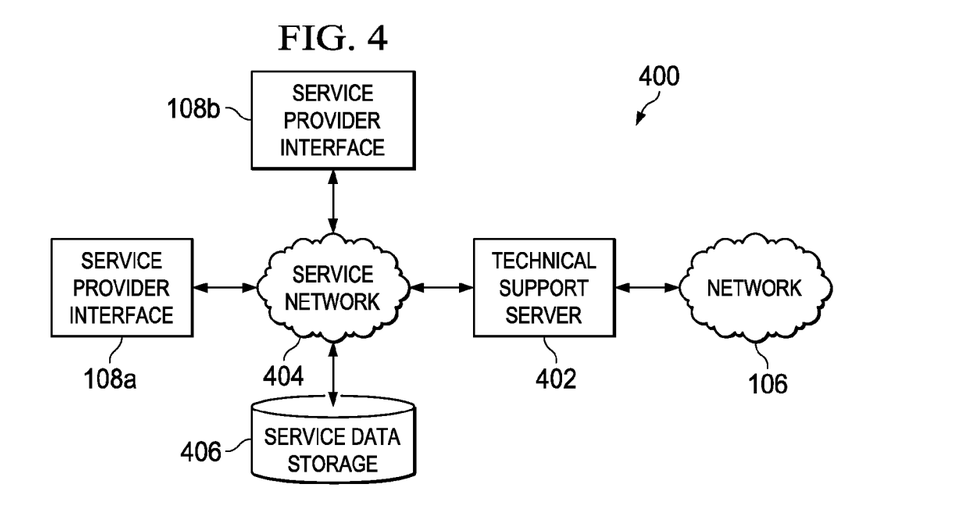
FIG. 4 is a diagram illustrating one embodiment of a user support system configured for maintaining technical support continuity across system restarts and multiple operating systems.

The system 100 of FIG. 1 is just one example of a possible system which may be used according to the present embodiments. Certain components of system 100 may be added or omitted without substantial change to the fundamental operation of the system. For example, while it may be useful to include a removable storage media 104, this component of system 100 may be omitted in various embodiments. Similarly, a user interface device 102 may access an application server during a user support session, but this component of system 100 may also be omitted in various embodiments. Additionally, image storage 112 may be useful to a service technician during a user support session, but this component may also be omitted in various embodiments. One of ordinary skill will also recognize that certain components may be added to system 100, for example as shown in FIG. 4.

Figure 2:
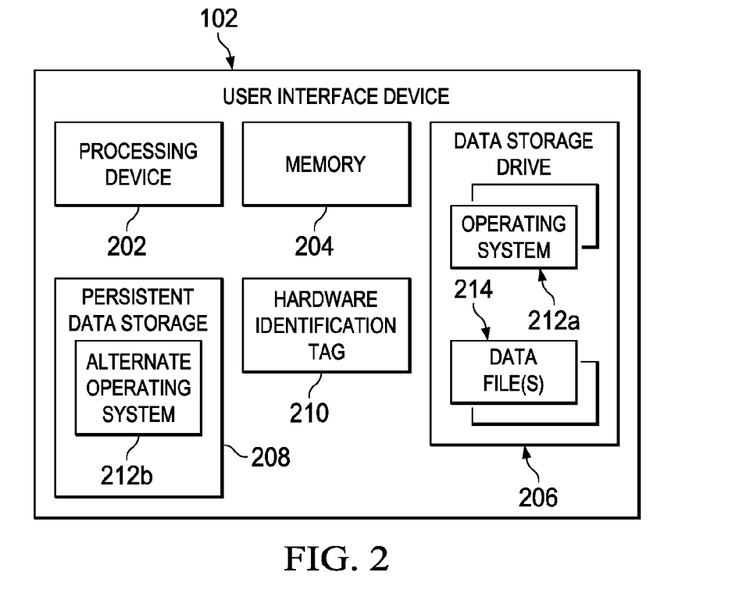
FIG. 2 is a diagram illustrating one embodiment of a user interface device configured for maintaining technical support continuity across system restarts and multiple operating systems.

FIG. 2 is a diagram illustrating one embodiment of a user interface device 102 configured for maintaining technical support continuity across system restarts and multiple operating systems. In an embodiment, the user interface device 102 may include a processing device 202, a memory 204, a data storage drive 206, a persistent data storage 208, and a unique identifier 210. In various embodiments, the unique identifier 210 may be a hardware identification tag, a system-specific service tag, etc. One of ordinary skill will recognize alternative embodiments of a user interface device 102. For example, in certain embodiments the user interface device 102 may omit certain elements described in FIG. 2, or may add certain additional elements not described in FIG. 2.

In an embodiment, the processing device 202 may execute programmed instructions stored in the memory 204 or the data storage drive 206. For example, the data storage drive may store program code associated with a first operating system 212. Portions of the code for the first operating system 212 may be loaded by the processing device 202 into the memory 204. In an embodiment, the first operating system is a Windows® operating system available from Microsoft® Corporation. Additionally, the processing device 202 may access data files stored in either the memory 204 or the data storage drive 206. In an embodiment, a user of the user interface device 202a may access data files 214 using controls provided by the operating system 212.

In certain embodiments, one or more data files 214, or the first operating system 212 may experience a fault. Faults may include hardware malfunctions or failures or software failures. In such an embodiment, the processor 202 may access code for system recovery. In a particular embodiment, the system recovery code may cause the processor 202 to load a second operating system, such as an alternate operating system 212.

Additionally, in various embodiments, the processing device 202 may store user data on a persistent data storage 208 for recovery in the event of a fault. In a particular embodiment, the persistent data storage device 208 may store recently accessed files. In another embodiment, the persistent data storage 208 may contain code for the alternate operating system 212. In such an embodiment, the alternate operating system 212 may still be accessible, even if the data storage drive is inaccessible. In still other embodiments, the persistent data storage 212 may store system configuration settings, system fault logs, system status logs, etc. In a particular embodiment, the persistent data storage 208 may be non-volatile data storage, such as flash storage. In still a further embodiment, data in the persistent data storage 208 may be accessible by removable storage media 104.

Figure 3:
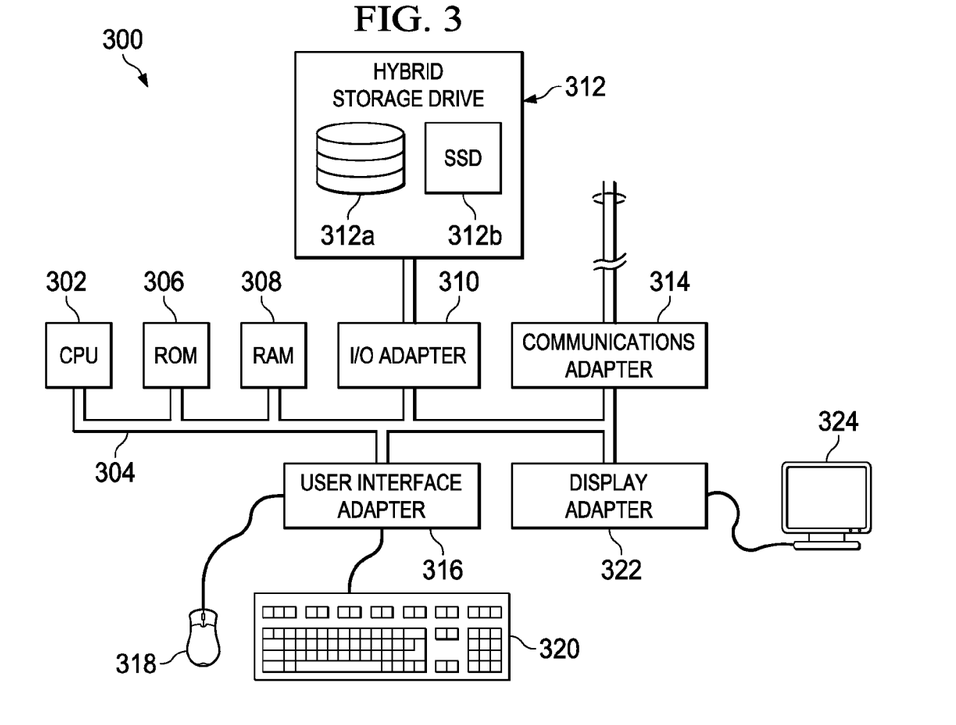
FIG. 3 is a block diagram of an example of an Information Handling System (IHS) according to some embodiments.

FIG. 3 illustrates a computer system 300 adapted according to certain embodiments of a user interface device 102a-b, the service provider interface 108, the application server 110, and/or the image server 112. The central processing unit (CPU) 302 is coupled to the system bus 304. In an embodiment, the processing device 202 may be implemented with CPU 302. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 4-7.

The computer system 300 also may include Random Access Memory (RAM) 308, which may be SRAM, DRAM, SDRAM, or the like. The computer system 300 may utilize RAM 308 to store the various data structures used by a software application configured to maintain technical support continuity across system restarts and multiple operating systems. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data. In various embodiments, memory 204 of user interface device 102 may be implemented with ROM 306 and/or RAM 308.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for interacting with operating system 212. In a further embodiment, the display adapter 322 may display a user support session, such as a chat window.

The I/O adapter 310 may connect to one or more storage devices 312, such as one or more of a hard drive, a Compact Disk (CD) drive, a floppy disk drive, a tape drive, to the computer system 300. In a particular embodiment, the storage devices 312 may be hybrid storage drives, which include both magnetic data storage disks 312a and a SSD 312b. In other embodiments, flash memory may be substituted for the SSD 312b. The SSD 312b may comprise the persistent data storage 208, which in one embodiment, may store code for the alternate operating system 212. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, tablet computers, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

FIG. 4 is a diagram illustrating one embodiment of a user support system 400 configured for maintaining technical support continuity across system restarts and multiple operating systems 212. In an embodiment, the user support system 400 may include a technical support server 402 coupled to the network 106. The technical support server 402 may receive a request from a user interface device 102 to establish a user support session for receiving technical support. The technical support server 402 may be coupled to a service network 404. The service network 404 may include one or more service provider interfaces 108a-b and a service data storage device 406.

In response to receiving the request to establish a user support session from the user interface device 102, the technical support server 402 may identify a technical support technician who is available to handle the user support session. For example, the user support session may be established between service provider interface 108a and user interface device 102a. During the user support session, service data may be collected from the user interface device 102a and/or generated by the technician at the service provider interface 108a. The service data may be stored on service data storage 406.

In a particular embodiment, the user interface device 102a may supply unique identifier 210 to the technical support server 402. The unique identifier 210 may be a unique identifier associated specifically with the user interface device 102a. In an embodiment, the unique identifier 210 may be a hardware identification tag, a system-specific service tag, etc. The unique identifier 210 may be used by the technical support server 402 to uniquely identify the user support session and distinguish it from other user support sessions established with other user interface devices, e.g., user interface device 102b. Additionally, the service data may be stored on the service data storage 406 in a database that is, at least in part, keyed to or associated with the unique identifier 210.

In an embodiment, the technician may instruct the user of the user interface device 102a to reboot the user interface device 102a. In such an embodiment, the user support session may be terminated. Further complicating typical user support operations, the user may reboot into an alternate recovery operating system, which is separate from the primary operating system used to initially contact the technician. When the user interface device 102a successfully reboots, the user may wish to continue the user support session with the same technician. In such an embodiment, the user interface device 102a may send a request to reestablish the user support session with the technician to the technical support server 402. The technical support server 402 may request the unique identifier 210 from the user interface device 102a. Alternatively, the user interface device 102a may automatically send the unique identifier 210 along with the request. In such an embodiment, the technical support server 402 may determine that the technician handling the user support session is using service provider interface 108a and notify the service provider interface 108a to reestablish the user support session.

If the technician is busy at the time of the request to reestablish the user support session, the user of the user interface device 102a may be notified. The user may be asked if he/she would prefer to establish a user support session with another technician or wait for the previous technician to become free. In a further embodiment, the user may be prompted to provide contact or scheduling information for arranging a later time for reestablishing the user support session with the same technician. For example, the user may be prompted to provide a call-back number so that the user may be notified that the technician is free to reestablish the user support session. In another embodiment, a block of time may be scheduled to reestablish the user support session with the technician.

In one embodiment, the user support session may include a text-based chat session. In another embodiment the user support session may include a video-based chat session. In still another embodiment, the user support session may include a voice-based chat session. The user support session may additionally include a remote screen viewing session, a remote access session, a remote control session, etc. In still a further embodiment, the user support session may provide the technician with access to data and/or applications stored on the user interface device 102a.

One of ordinary skill will recognize that the embodiment presented in FIG. 4 is only one example of a system for providing services to a user interface device 102. Alternative or additional features of a user support system 400 may be implemented by one of ordinary skill Additionally, one of ordinary skill will recognize that alternative services may be provided, such as sales and marketing services, and other services which may involve a service provider providing a computer-based service via a service provider interface 108 to a user of a user interface device 102.

Figure 5:
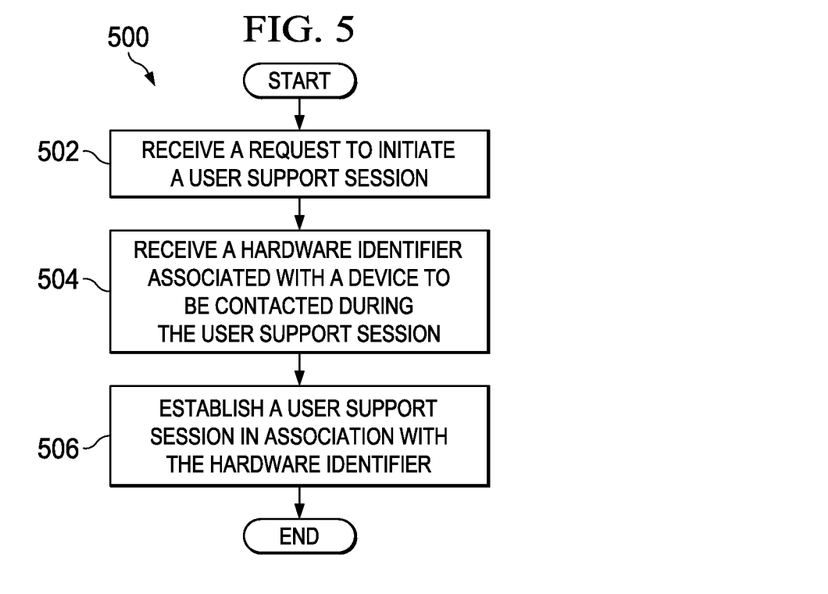
FIG. 5 is a flowchart diagram illustrating one embodiment of a method for maintaining technical support continuity across system restarts and multiple operating systems.

FIG. 5 is a flowchart diagram illustrating one embodiment of a method 500 for maintaining technical support continuity across system restarts and multiple operating systems 212. In an embodiment, the method 500 starts when the processing device 202 loads program instructions which cause the processing device 202 to send a request to initiate a user support session to a technical support server 402 as shown at block 502. At block 504, the user interface device 102 sends a unique identifier, such as unique identifier 210 associated with the user interface device 102a to the technical support server. The method 500 may also include establishing a user support session with the technical support server in association with the unique identifier as shown at block 506.

Figure 6:
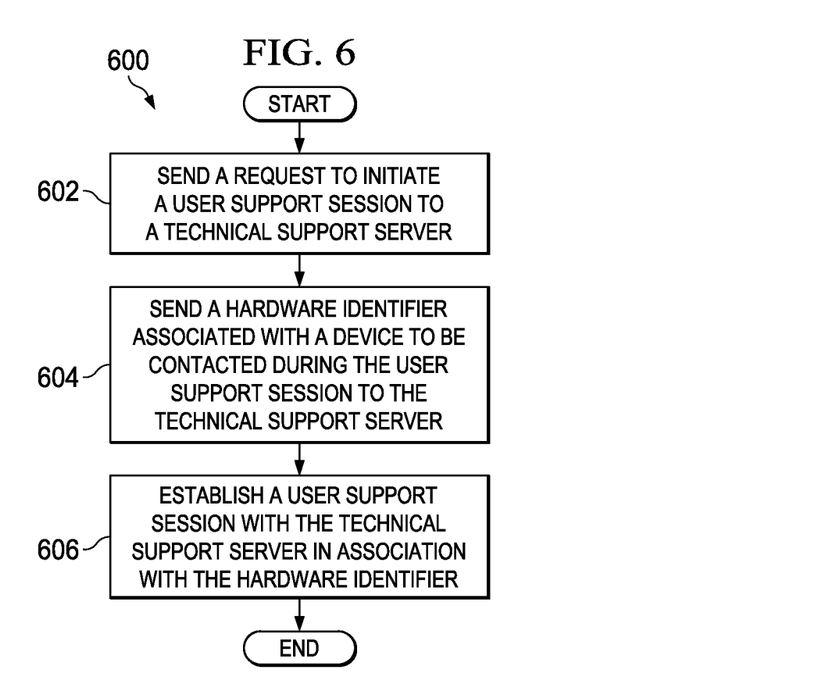
FIG. 6 is a flowchart diagram illustrating another embodiment of a method for maintaining technical support continuity across system restarts and multiple operating systems.

FIG. 6 is a flowchart diagram illustrating another embodiment of a method 600 for maintaining technical support continuity across system restarts and multiple operating systems 212. In an embodiment, the technical support server 402 may receive a request to initiate a user support session as shown at block 602. Additionally, the technical support server 402 may receive the unique identifier 210 associated with the user interface device 102a to be contacted during the user support session as shown at block 604. The technical support server 402 may then establish a user support session in association with the unique identifier 210 between the service provider interface 108a and the user interface device 102a as shown at block 606.

Figure 7:
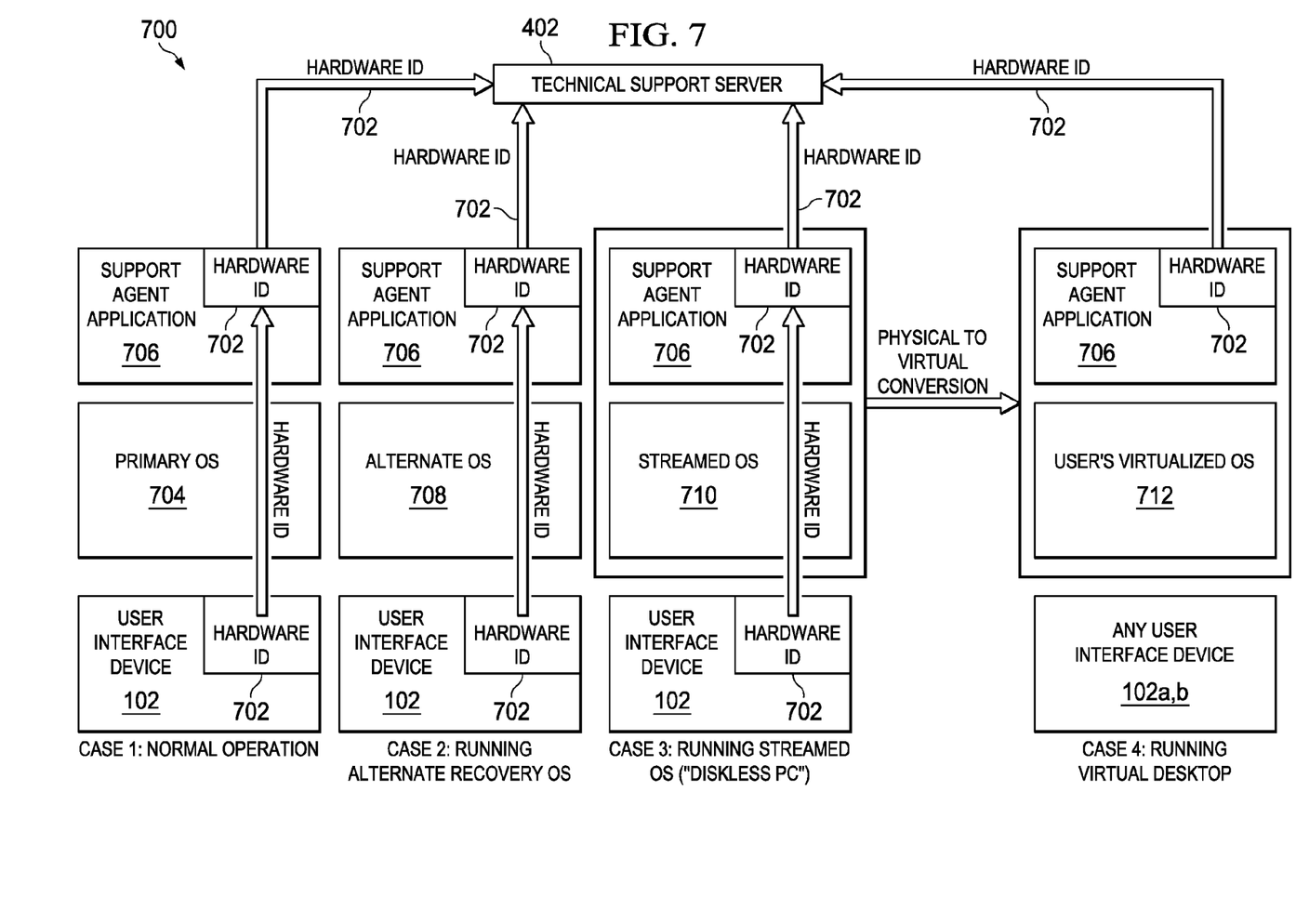
FIG. 7 is a diagram illustrating alternative operation cases of the system for maintaining technical support continuity across system restarts and multiple operating systems.

FIG. 7 is a diagram illustrating alternative operation cases 700 of the system for maintaining technical support continuity across system restarts and multiple operating systems 212. Each of the use cases 700 are described in terms of a simplified software stack. For example, case 1 describes normal operation of user interface device 102. In the normal operation, the primary operating system 704 of user interface device 102 retrieves hardware ID 702. The operating system 704 then communicates the hardware ID 702 to a support agent 706 application which is installed on the user interface device 102 and operated by operating system 704. The support agent application 706 may then communicate the hardware ID 702 to the technical support server 402 along with a request to initiate a user support session. If the user support session is terminated, for example because of a system reboot, then the support agent application 706 may send a request to reestablish the user support session to the technical support server 402 along with the hardware ID 702. In such an embodiment, the user support session may be reestablished with the same technical support technician.

Use case 2 illustrates an embodiment where the user interface device 102 switches to an alternate operating system 708. For example, the user interface device 102 may shut down the primary operating system 704, which may be a Windows® operating system to an alternate operating system 708, which may be an alternate recovery operating system. One of ordinary skill will recognize various operating systems which may be used for the primary operating system or the alternate operating system 708. In such an embodiment, the alternate operating system 708 may access the hardware ID 702 and communicate it to the support agent application 706. The support agent application 706 may send the hardware ID 702 along with a request to reestablish the user support session. In response to receiving the request and the hardware ID 702, the technical support server 402 may reestablish the user support session between the service provider interface 108a and the user interface device 102a, for example.

In use case 3, the user interface device 102 may enable a user to operate a streaming operating system 710. For example, the application server 110 may host the operating system 710 and stream user interface information to the user interface device 102a, b. In such an embodiment, the streaming OS 710 may request the hardware ID 702 associated with the user interface device 102a, for example. In one embodiment, the streaming OS 710 may directly access the hardware ID 702. In another embodiment, the streaming OS 710 may prompt the user to provide the hardware ID 702. The streaming OS 710 may then provide the support agent application 706, which may also be hosted by application server 110. The support agent application 706 may then send a request to the technical support server 402, for example. The request may include the hardware ID 702.

Use case 4 describes an embodiment in which a user's operating system 712 is virtualized and can be accessed by any user interface device 102. For example, the user may access the virtualized OS 712 with a first user interface device 102a. If a fault occurs, the user may switch to a second user interface device 102b and access the virtualized OS 712. In such an embodiment, the virtualized OS 712 may prompt the user for a unique identifier, such as a hardware ID 702 associated with the user's primary user interface device (e.g., user interface device 102a). The virtualized OS 712 may then communicate the unique identifier to the support agent application 706 which sends a request to establish a user support session along with the unique identifier to the technical support server 402.

One of ordinary skill will recognize that the various use cases described in FIG. 7 may be implemented with various alternative services provided by alternative service providers. In each case, the unique identifier may be communicated to the service provider interface 108 to maintain consistency of data storage and user support sessions.

Figure 8:
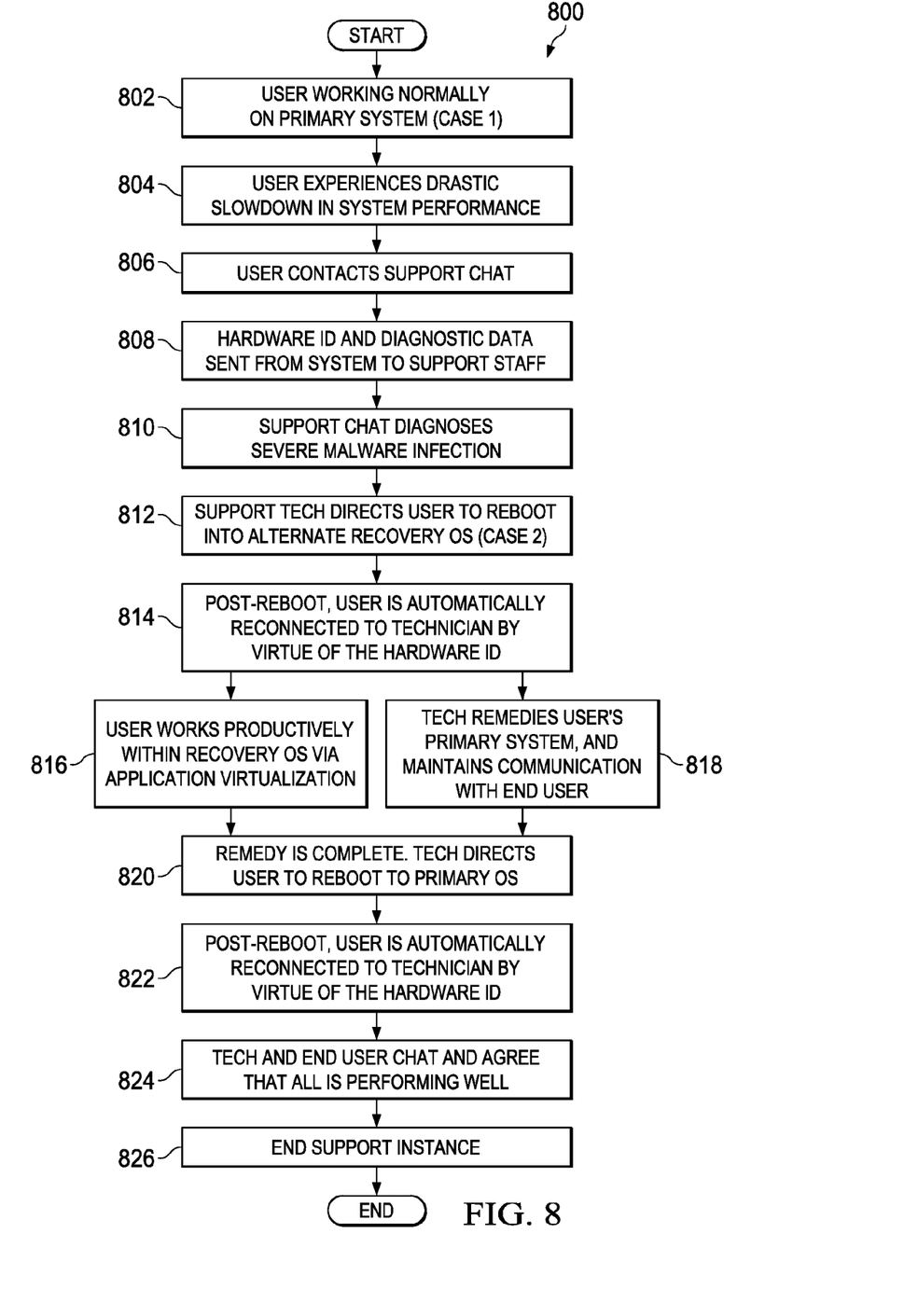
FIG. 8 is a flowchart diagram illustrating another embodiment of a method for maintaining technical support continuity across system restarts and multiple operating systems.

FIG. 8 is a flowchart diagram illustrating another embodiment of a method 800 for maintaining technical support continuity across system restarts and multiple operating systems. In an embodiment, the method 800 starts with the user working normally on a primary user interface device 102a, for example, as shown at block 802. Block 802 illustrates an example of use case 1 described in FIG. 7. In the event that the user experiences a drastic slowdown in system performance, or other system fault, as shown at block 804, the user may contact a technical support service provider to establish a user support chat session as illustrated in block 806. In another embodiment, the contact may be made automatically by the user interface device 102 upon reboot. The user interface device 102a may then send the hardware ID 702 and diagnostic data from the user interface device to the technician as shown at block 808. In an embodiment, the hardware ID 702 and the diagnostic data may be stored in the service data storage 406. In an embodiment, the support technician may diagnose a severe malware infection 810 on the user interface device 102a as shown at block 810 and direct the user to reboot the user interface device 102a into an alternate OS 708 as illustrated in block 812 and use case 2 of FIG. 7. At that point, the user support session may be terminated. One of ordinary skill will recognize that the embodiments described in FIG. 7 is merely an example, and that the present embodiments may be used by various service providers to provide various types of user support sessions, and to resolve various types of issues involving system performance, etc.

Upon reboot, the user may be automatically reconnected to the technician by support agent application 706 which uses the hardware ID 702 to reestablish the user support session as shown at block 814. At that point, the user may be able to continue to work productively within the alternate OS 708 via application virtualization services provided by application server 110 as shown at block 816. At the same time, the technician may continue to remedy the user's primary operating system 704 and maintain the user support session with the user as shown at block 818.

When the remedy is complete, the technician may direct the user to reboot to the primary OS 704 as shown at block 820. At that point, the user support session may be terminated again. Upon successful reboot of user interface device 102a, the user may be automatically reconnected to the technician by the support agent application 706 using the hardware ID 702 as shown at block 822. The technician and the user may chat and evaluate system performance as shown at block 824. When the technician and the user agree that the issues have been resolved, the user support session may be terminated as shown at block 826.

* * *

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising: a processor; and a memory coupled to the processor, the memory including program instructions stored thereon that, upon execution by the processor, cause the IHS to:
receive a first request to initiate a user support session between a device and a support provider, wherein the first request includes a unique hardware identifier of the device, and wherein the device includes a hybrid storage drive having a magnetic disk portion and a solid state drive (SSD) portion;
establish a first portion of the user support session between the device and a first technician of the support provider via a support agent executed by the device under operation of a first operating system, wherein the first operating system is stored in the magnetic disk portion of the hybrid storage drive; transmit a reboot instruction to the device or to a user of the device, wherein the reboot instruction directs the device or the user to reboot into a second operating system stored in the SSD portion of the hybrid storage drive, wherein the SSD portion further stores files recently accessed by the user via the first operating system prior to the reboot;
receive a second request to re-establish the user support session between the device and the support provider, wherein the second request includes the unique hardware identifier, and wherein the second request is sent by the device under control of the second operating system;
identify, among a plurality of different service provider interfaces, a service provider interface that is being used by the first technician establish a second portion of the user support session with the first technician, at least in part based upon the unique hardware identifier and the identification of the service provider interface, wherein the second operating system allows the user to manipulate the files during the second portion of the user support session;
in response to a remedying process being completed during the second portion of the user support session, provide instructions for the device or the user to reboot the device into the first operating; system;
receive a third request to re-establish the user support session between the device and the support provider, wherein the third request includes the unique hardware identifier, and wherein the third request is sent by the device under control of the first operating system; and
establish a third portion of the user support session, at least in part based upon the unique hardware identifier, wherein technical support continuity is maintained between the second and third portions of the user support session;
determine that the first technician is unavailable when the second request is received;
allow the user to choose whether to wait until the first technician is available to establish the second portion of the user support session with the first technician;
in response to the user choosing to establish the second portion of the user support session with the first technician, collect scheduling information indicating a later time for establishing the second portion of the user support session; and establish the second portion of the user support session with the first technician at the later time.

2. The IHS of claim 1, wherein the program instructions are further configured to cause the IHS to terminate the user support session.

3. The IHS of claim 1, wherein the program instructions are further configured to cause the IHS to store information associated with the user support session in association with the unique hardware identifier.

4. The IHS of claim 1, wherein the user support session comprises a chat session between the support provider and the user.

5. The IHS of claim 4, wherein the chat session is a text-based chat session.

6. The IHS of claim 4, wherein the chat session is a voice-based chat session.

7. The IHS of claim 4, wherein the chat session is a video-based chat session.

8. In an Information Handling System (IHS) having a processor and
a memory coupled to the processor, the memory having program instructions stored thereon that, upon execution by the processor, configure the IHS to maintain technical support continuity, a method, comprising:
receiving a first request to initiate a user support session between a device and a support provider, wherein the first request includes a unique hardware identifier of the device, and wherein the device includes a hybrid storage drive having a magnetic disk portion and a solid state drive (SSD) portion;
establishing a first portion of the user support session between the device and a first technician of the support provider via a support agent executed by the device under operation of a first operating system, wherein the first operating system is stored in the magnetic disk portion of the hybrid storage drive;
transmitting a restart instruction to the device or to a user of the device wherein the restart instruction directs the device or the user to restart the device into a second operating system, stored in the SSD portion of the hybrid storage drive, wherein the SSD portion further stores files recently accessed by the user via the first operating system prior to the restart;
receiving a second request to re-establish the user support session from the device,
wherein the second request includes the unique hardware identifier, and wherein the second request is sent by the device under control of the second operating system;
identifying, among a plurality of different service provider interfaces, a service provider interface that is being used by the first technician;
establishing a second portion of the user support session with the first technician, at least in part based upon the unique hardware identifier and the identification of the service provider interface, wherein the second operating system allows the user to manipulate the files during the second portion of the user support session while the first technician performs a remedying of the first operating system; in response to the remedying process being completed during the second portion of the user support session, provide instructions for the device or the user to restart the device into the first operating system;
receive a third request to re-establish the user support session between the device and the support provider, wherein the third request includes the unique hardware identifier, and wherein the third request is sent by the device under control of the first operating system; and
establish a third portion of the user support session, at least in part based upon the unique hardware identifier, wherein technical support continuity is maintained between the second and third portions of the user support session;

determining that the first technician is unavailable when the second request is received;

allowing the user to choose whether to wait until the first technician is available to establish the second portion of the user support session with the first technician;

in response to the user choosing to establish the second portion of the user support session with the first technician, collecting scheduling information indicating a later time for establishing the second portion of the user support session; and establishing the second portion of the user support session with the first technician at the later time.

9. The method of claim 8, wherein the first operating system is a primary operating system, and wherein the second operating system is a recovery operating system.

10. The method of claim 8, further comprising storing information associated with the user support session in association with the unique hardware identifier.

11. The method of claim 8, wherein the user support session comprises a chat session between a support provider and a user of the device.

12. A memory device having program instructions stored thereon that, upon execution by a processor of an information Handling System (IHS), the IHS including a hybrid storage drive having a magnetic disk portion and a solid state drive (SSD) portion, the magnetic disk portion storing a first operating system and the SSD portion storing a second operating system, cause the IHS to:

send a first request to initiate a user support session to a technical support server; send a unique hardware identifier associated with the IHS to the technical support server; establish a first portion of the user support session with a first technician via a support agent executed by the IHS under operation of the first operating system; receive an instruction to perform a reboot or restart wherein the reboot instruction directs the IHS or the user to reboot into the second operating system; after the reboot into the second operating system, send, to the technical support server, a second request to re-establish the user support session between the IHS and the technical support server, wherein the second request includes the unique hardware identifier;

identify, among a plurality of different service provider interfaces, a service provider interface that is being used by the first technician;

establish a second portion of the user support session with the first technician, at least in part based upon the unique hardware identifier and the identification of the service provider interface, wherein the second operating system allows the user to manipulate files, stored in the SSD portion by the first operating system prior to the reboot, during the second portion of the user support session using a virtualized operating system provided by an application server while the first technician performs a remedying of the first operating system;

in response to the remedying process being completed during the second portion of the user support session, receiving instructions for the IHS or the user to reboot the IHS into the first operating system;

send, to the technical support server, a third request to re-establish the user support session between the IHS and the technical support server, wherein the third request includes the unique hardware identifier, and wherein the third request is sent by the IHS under control of the first operating system; and establish a third portion of the user support session, at least in part based upon the unique hardware identifier, wherein technical support continuity is maintained between the second and third portions of the user support session;

determine that the first technician is unavailable when the second request is received;

allow the user to choose whether to wait until the first technician is available to establish the second portion of the user support session with the first technician;

in response to the user choosing to establish the second portion of the user support session with the first technician, collect scheduling information indicating a later time for establishing the second portion of the user support session;

establish the second portion of the user support session with the first technician at the later time;

determine the first technician is unavailable when the third request is received;

allow the user to choose whether to wait until the first technician is available to establish the third portion of the user support session with the first technician;

in response to the user choosing to establish the third portion of the user support session with the first technician, collect scheduling information indicating another later time for establishing the third portion of the user support session;

and establish the third portion of the user support session with the first technician at the other later time.

13. The memory device of claim 12, wherein the program instructions are further configured to cause the IHS to terminate the user support session.

14. The memory device of claim 12, wherein the program instructions are further configured to cause the IHS to store information associated with the user support session in association with the unique hardware identifier.

15. The memory device of claim 12, wherein the user support session comprises a chat session between a support provider and a user of the device to be contacted during the user.

16. The memory device of claim 15, wherein the chat session is a text-based chat session.

17. The memory device of claim 15, wherein the chat session is a voice-based chat session.

18. The memory device of claim 15, wherein the chat session is a video-based chat session.

* * * * *

UNITED STATES PATENT AND TRADEMARK OFFICE
CERTIFICATE OF CORRECTION

PATENT NO. : 9,680,939 B2 Page 1 of 1
APPLICATION NO. : 14/134699
DATED : June 13, 2017
INVENTOR(S) : Philip M. Seibert et al.

It is certified that error appears in the above-identified patent and that said Letters Patent is hereby corrected as shown below:

In Column 11, Line 42, Claim 1, delete "operating;" and insert -- operating --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*